United States Patent [19]
Roberts

[11] 3,898,005
[45] Aug. 5, 1975

[54] HIGH DENSITY OPTICAL MEMORY STORAGE MEANS EMPLOYING A MULTIPLE LENS ARRAY

[75] Inventor: Donald L. Roberts, San Diego, Calif.

[73] Assignee: NCR Corporation, Dayton, Ohio

[22] Filed: Jan. 4, 1974

[21] Appl. No.: 430,933

[52] U.S. Cl. .................... 355/54; 354/77; 354/125
[51] Int. Cl. .................... G03b 29/00
[58] Field of Search .......... 355/39, 40, 42, 46, 53, 355/54, 64; 354/75, 76, 77, 120, 125, 7, 12

[56] References Cited

UNITED STATES PATENTS

| | | | |
|---|---|---|---|
| 3,387,547 | 6/1968 | Houghton | 354/110 X |
| 3,590,712 | 7/1971 | Ataka | 354/125 |
| 3,617,125 | 11/1971 | Sobottke | 355/46 |
| 3,703,135 | 11/1972 | Lang | 354/120 |
| 3,704,068 | 11/1972 | Waly | 355/54 X |
| 3,796,487 | 3/1974 | Voorhees | 354/77 X |

*Primary Examiner*—Richard A. Wintercorn
*Attorney, Agent, or Firm*—J. T. Cavender; James H. Phillips; Edward A. Gerlaugh

[57] ABSTRACT

Information is optically recorded very densely on high resolution film by displaying the information on a page composer, such as a cathode ray tube, electro-optic shutter, or a light emitting diode array, and concentrating the displayed information onto the film utilizing a multiple lens array. A moveable aperture is disposed to pass light from the page composer through a selected single lenslet of the array. After a block of information has been recorded through the selected lenslet onto a corresponding area of the film, the aperture is moved to another lenslet, and another block is displayed and recorded. This process is repeated until all desired information has been recorded on the film. The resulting "master" mask may then be processed and reproduced using standard photographic techniques.

This abstract is not to be taken either as a complete exposition of or as a limitation on the present invention. The full nature and extent of the invention may only be discerned by reference to the entire disclosure.

5 Claims, 4 Drawing Figures

HIGH DENSITY OPTICAL MEMORY STORAGE MEANS EMPLOYING A MULTIPLE LENS ARRAY

This invention relates to information storage and, more particularly, to high density optical read only memories.

This application contains subject matter related to the disclosure of application Ser. No. 430,932, entitled "Means Employing A Multiple Lens Array For Reading From A High Density Optical Memory Storage" by Donald L. Roberts, filed on even date herewith and assigned to the assignee of the present invention.

The desirability of realizing a read only memory system having massive storage capabilities, relatively fast access time, and low cost, has resulted in extensive investigation of various optical memories. Holographic, shadow masking, and fiber-optic multiplexing techniques appear to have significant potential but are deemed impractical at the contemporary state-of-the-art. Thus, those skilled in the art appreciate the importance of achieving practical read only memory storage which exhibits the above stated characteristics.

It is therefore a broad object of my invention to provide an improved optical memory storage system.

It is another object of my invention to provide such a system which reliably achieves extremely high storage density.

It is yet another object of my invention to provide such a system which is relatively simple and economical to fabricate and utilize.

Briefly, these and other objects of the invention are achieved by employing a multiple lens array and a moveable aperture disposed to pass light from a cathode ray tube through a selected lenslet of the array for recording at a predetermined area on high resolution film. The aperture is methodically moved from lenslet to lenslet as successive pages of information are displayed on the page composer, and a "page" of information is recorded in each such area. This procedure is continued until all desired information has been recorded on the film. The film is then developed into a master mask which can be reproduced by standard photographic techniques.

The subject matter of the invention is particularly pointed out and distinctly claimed in the concluding portion of specification. The invention however, both as to organization and method of operation, may best be understood by reference to the following detailed description taken with reference to the accompanying drawing of which:

Figure 2:
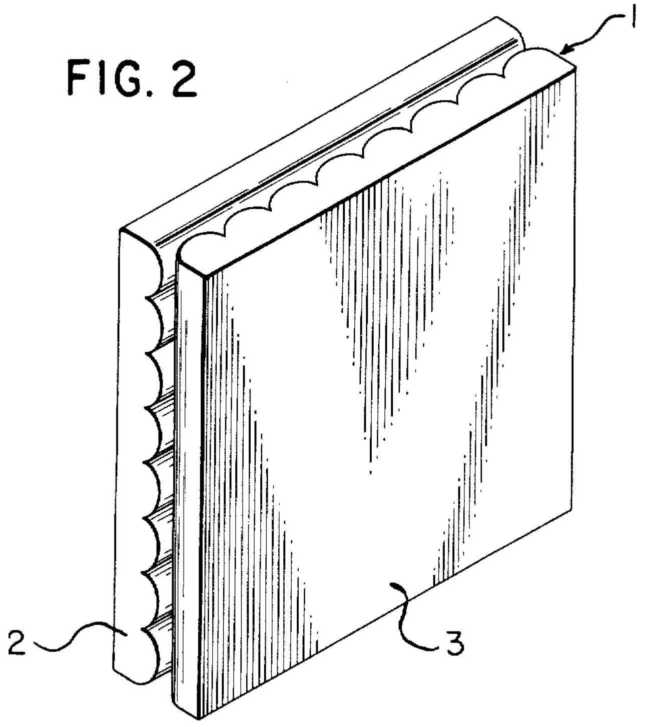
FIG. 2 is a perspective view of a section of a multiple lens array which is a fundamental constituent of the system.

Attention is first directed to FIG. 2 which illustrates a multiple lens array 1. The multiple lens array is a fundamental component of the system such that a brief statement of its characteristics is deemed useful to a complete understanding of the invention. Briefly, the multiple lens array 1 comprises similar halves 2 and 3 of plastic substrates, each having parallel corrugations on one face. The array halves are oriented with the faces carrying the corrugations crossed at 90° and brought together to provide a square lenslet at each intersection of the corrugations. 64 parallel corrugations per inch, a conservative density at the state of the art, provides 4,096 lenslets per square inch (25 parallel corrugations per centimeter provides 625 lenslets per square centimeter). Each lenslet has a speed in the range of $f/2.7$ to $f/3.2$ with resolution capability of 400–450 lines/mm. Thus, 4 micron diameter spot sizes may be comfortably worked with to achieve a discrete spot density on the order of $4 \times 10^7$ per square inch ($6.25 \times 10^6$/cm.$^2$).

The array halves are very uniform as a consequence of the fabrication technique employed. A metal negative master is prepared with a linear or Bonnet rotary ruling engine, and array halves are then "cast" from the master. At the state of the art the center to center accuracy of the lenslet is better than 4/10,000 inch per 20 inches (0.01 mm./50 cm.), and the focal length tolerance is better than one-tenth of 1%. This uniform accuracy provides the basis for the recording precision necessary to enable read apparatus (which employs an identical multiple lens array) to access the stored information.

Figure 1:
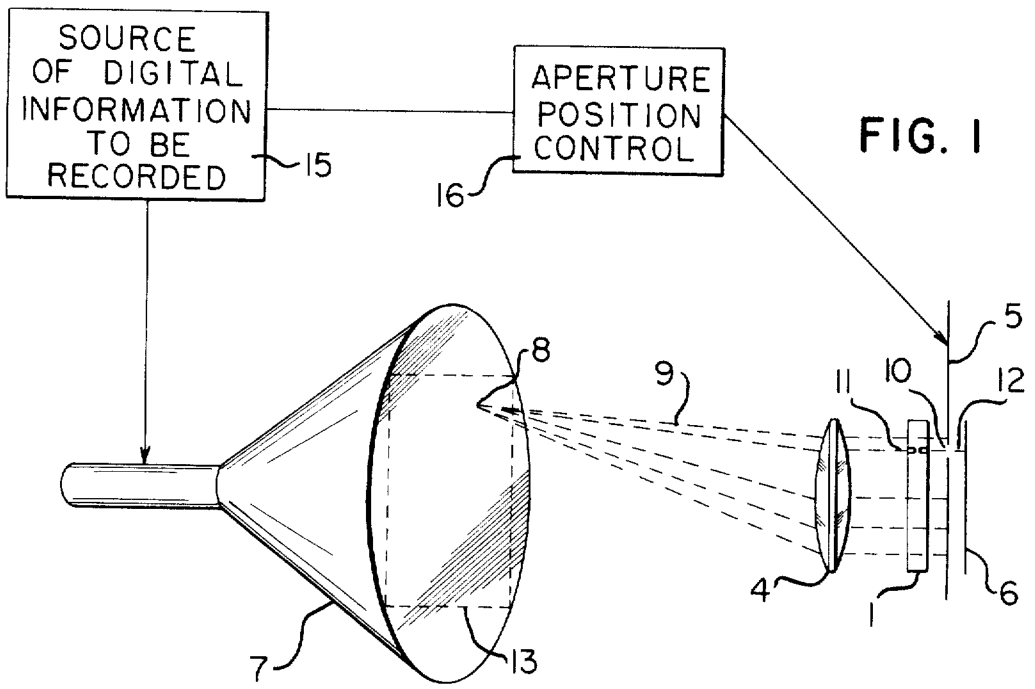
FIG. 1 is a schematic representation illustrating generally the recording system employed in the invention.

Referring now to FIG. 1, it will be observed that a multiple lens array 1 is disposed in the system between a collimating lens 4 and a selectively positionable aperture plate 5. Information to be recorded on photosensitive film 6 is presented on a page composer display such as the face of a cathode ray tube 7. The photosensitive film is disposed in the image plane of the multiple lens array 1. The distance between the face of the cathode ray tube 7 and the lens 4 is the focal distance of the lens 4. Thus, light originating at any position within the display area of the tube face is presented to each lenslet in the multiple lens array 1. By way of example, a spot of light appearing at point 8 on the face of the tube 7 produces a beam 9 which is collimated by the lens 4 prior to impingement upon each lenslet in the multiple lens array 1.

Figure 4:
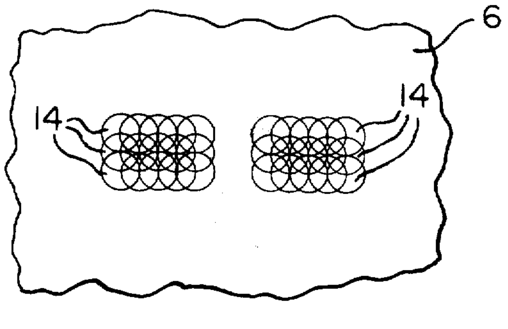
FIG. 4 illustrates a presently preferred grouping of information spots into recorded information bits.

The aperture plate 5 is controllably positionable in both the X and Y directions to achieve alignment of an aperture 10 in the plate with any single one of the lenslets comprising the multiple lens array 1. As a result, alignment of the aperture 10 with exemplary lenslet 11 exposes the area 12 of the photosensitive film 6 to the entire page of information displayed in the rectangular area 13 on the face of the cathode ray tube 7. With high resolution photosensitive films, such as Eastman Kodak High Resolution Plate (2000 lines/mm), or equivalent, utilized as the master recording medium, it has been found that a page of information may readily contain 64 words of 40 bits each where each bit comprises 15 spots 14 overlapped as shown in FIG. 4. This overlapping technique contributes to exceedingly high write/read reliability which is maintained in prints made from the master mask utilizing very high resolution film such as Agfa-Gavaert 10E56 (1000 lines/mm) on a polyester base.

Therefore, it will be understood that, assuming a 1 square inch multiple lens array 1 and a total recording area of 1 square inch on the photosensitive film 6, 4,096 pages of digital information is recorded on the photosensitive film by methodically displaying the information (from any suitable source 15) page-by-page, correspondingly positioning the aperture plate 5 between pages. The aperture position control 16 may comprise servo control means such as that shown in more detail in FIG. 3. Positioning the aperture plate 5 is carried out quite rapidly since the system is ordinarily employed to make a master mask whereby the aperture plate 5 need only index between adjacent sequential positions.

The speed with which the master mask can be exposed depends on several variables; viz.: the speed of the film 6, the speed of the individual lenslets of the multiple lens array 1, the intensity of the light spots appearing on the face of the cathode ray tube 7, the decay time of the phosphors of the tube, etc. With a cathode ray tube using a high efficiency phosphor, a screen current of 100 microamperes, and 10 KV high voltage, a Lambertian radiation of approximately 150 mw is achieved, and about $10^{-5}$ of this is collected by each of the 4,096 lenslets. After transmission losses are accounted for and assuming the characteristics given above for the multiple lens array and the film, roughly $8 \times 10^3$ ergs/sec $cm^2$ of light falls on the area of the photographic plate behind a selected lenslet. Since high resolution plates have a sensitivity of about 1000 ergs/$cm^2$, the exposure time per page is on the order of 0.125 seconds. The indexing time of the aperture plate is about 0.005 seconds. Thus, the total time required to expose a master plate is (0.130 seconds) (4,096) = 8 minutes, 52 seconds. After a master mask has been completely exposed, it is developed, and prints are prepared from the master for comprehensive distribution.

Figure 3:
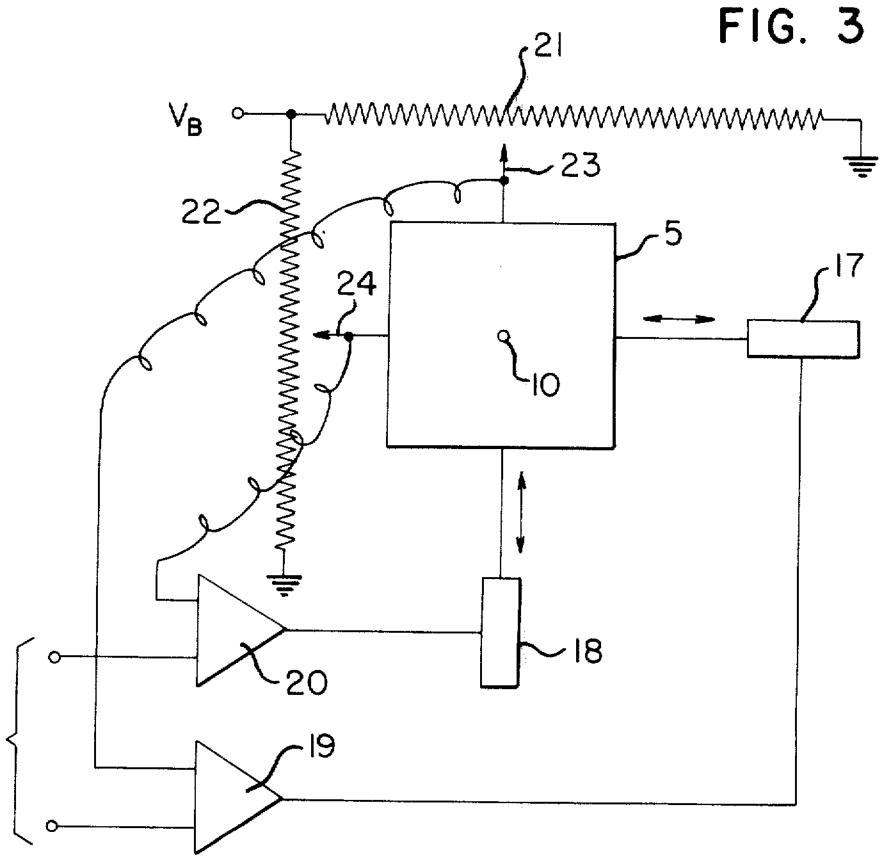
FIG. 3 is a schematic representation of exemplary servo means for positioning the moveable aperture.

Exemplary aperture plate positioning means is illustrated in FIG. 3. The plate 5, carrying a centrally disposed aperture 10, is moved in the X direction by X servo motor 17 and in the Y direction by Y servo motor 18. A bias voltage $V_b$ is applied across X position potentiometer 21 and Y position potentiometer 22 in order that voltage signals representing instantaneous X and Y positions may be picked up at taps 23 and 24. The X position signal obtained at tap 23 is applied as a feedback input to X servo amplifier 19. Similarly, the Y position information observed at tap 24 is applied as a feedback signal to Y servo amplifier 20. The servo motors 17 and 18 are driven, respectively, by the servo amplifiers 19 and 20 which receive signals representing the desired two dimensional position of the aperture plate 5 from the information source 15.

Those skilled in the art will understand that FIG. 3 is somewhat simplified in that, in practice, it is necessary to have one of the servo motors and its corresponding position potentiometer disposed on a carriage or the like for free movement in the other coordinate with the aperture plate 5.

While the principles of the invention have now been made clear in an illustrative embodiment, there will be immediately obvious to those skilled in the art many modifications of structure, arrangements, proportions, the elements, materials, and components used in the practice of the invention which are particularly adapted for specific environments and operating requirements without departing from those principles.

What is claimed is:

1. An information storage system comprising:

A. display means for displaying the information;

B. a multiple lens array disposed in the field of view of said display means, said multiple lens array comprising first and second substrates each having parallel corrugations on a face thereof, said faces brought together with the parallel corrugations of said first substrate perpendicular to the parallel corrugations of said second substrate, said corrugations forming at each intersection thereof one of a plurality of lenslets;

C. a photosensitive film disposed in the image plane of said multiple lens array; and D. an aperture plate disposed parallel to and proximate said multiple lens array, said aperture plate having an aperture dimensioned to pass a light beam with a cross-sectional area equal to the cross-sectional area of one of said lenslets.

2. The information storage system of claim 1 in which said aperture plate is disposed between said multiple lens array and said photosensitive film.

3. The information storage system of claim 2 which further includes means for aligning said aperture with a selected one of said lenslets.

4. The information storage system of claim 1 in which said display means is a cathode ray tube.

5. The information storage system of claim 1 wherein said parallel corrugations are of a density of at least 25 per centimeter and said photosensitive film has a resolution of at least 2,000 lines per millimeter.

* * * * *